2,953,464

FIRE-RETARDANT CELLULOSIC COMPOSITIONS AND PROCESS FOR PRODUCING FIRE-RETARDANT CELLULOSIC STRUCTURES THEREFROM

Elmer H. Rossin, Springfield, and Milton J. Scott, Lexington, Mass., assignors to Monsanto Chemical Company, St. Louis, Mo., a corporation of Delaware No Drawing. Original application Ser. No. 234,666, June 30, 1951, now Patent No. 2,816,004, dated Dec. 10, 1957. Divided and this application Dec. 14, 1956, Ser. No. 628,221

9 Claims. (Cl. 106—15)

The present invention relates to cellulosic compositions which are capable of being formed into flame-retardant structures such as filaments, films and the like. The present invention also relates to processes for producing afterglow-resistant and flame-retardant cellulose ether and regenerated cellulose structures such as films, filaments and the like, and to the structures so produced.

It has been proposed heretofore to impregnate cotton fabrics with various inorganic salts of phosphoric acid such as diammonium phosphate to impart fire-retardant properties to such fabrics. However, such treatment provides a fabric which is firm and stiff due to the crystallization of the salt in the fabric. Moreover, the fire-retardant finish thus produced is fugitive and is readily removed by laundering or by leaching the fabric with water. Consequently, such fabrics have found only limited commercial acceptance in the textile trade.

Cellulose fabrics and regenerated cellulose films have also been treated with water-soluble reaction products of ammonia and phosphorous pentoxide and then dried to provide a fire-retardant finish. While such finish is more pleasing to the touch than the finish produced by diammonium phosphate, it is also fugitive and is readily removed from the fabrics or films by laundering or by leaching in water. Consequently, the materials thus treated are not acceptable where a material which must be wash-resistant or resistant to leaching with water is required.

It is one object of the present invention to provide cellulosic solutions which are capable of being coagulated with acidic aqueous solutions to form afterglow-resistant and fire-retardant cellulosic structures, which structures retain their afterglow-resistant and fire-retardant properties after a considerable number of launderings or on leaching in water.

It is a further object of this invention to provide a novel process of preparing afterglow-resistant and fire-retardant cellulosic structures such as afterglow-resistant and fire-retardant regenerated cellulose or cellulose ether filaments, films or fabrics, which structures retain their afterglow-resistant and fire-retardant properties after a considerable number of launderings, or on leaching in water.

It is a further object of this invention to provide afterglow-resistant and fire-retardant regenerated cellulose and cellulose ether structures which retain their afterglow-resistant and fire-retardant properties after leaching in water, or, in the case of filaments and fabrics, after a considerable number of launderings in an aqueous medium.

Still further objects and advantages of the present invention will appear in the following description and the appended claims.

The cellulosic compositions of the present invention comprise, in general, an aqueous cellulosic spinning solution or dope which contains an amount of a neutral to alkaline reaction product of phosphoryl chloride and ammonia, prepared by reacting phosphoryl chloride and ammonia in an inert, anhydrous liquid, sufficient to impart afterglow-resistant and fire-retardant properties to the structure obtained by coagulating such spinning solution or dope in an acidic aqueous coagulating bath followed by leaching and drying. The amount of such reaction product used may be varied considerably. However, it is preferred to use from 3 to 25% by weight of such reaction product, based on the cellulose in the spinning solution or dope, in order to obtain a structure which is sufficiently afterglow-resistant and fire-retardant, and has sufficient strength to be useful as a commercial article of manufacture such as a free film, filament, fabric or the like.

The term "afterglow-resistant and fire-retardant" as used in the specification and appended claims is intended to designate a structure which is resistant to the propagation of flame across its surface after the igniting flame has been removed, and which is also resistant to the formation of a non-flaming combustion which manifests itself as a red glow or incandescence and which consumes the structure after all flame has been extinguished.

The terms "aqueous cellulosic spinning solutions" or "aqueous cellulosic dopes" as employed in the specification and the appended claims are intended to include true and colloidal solutions of cellulose in aqueous solutions of calcium thiocyanate, sodium zincate, sodium zincate and urea, benzyl substituted ammonium hydroxide such as trimethyl benzyl ammonium hydroxide and triethylbenzyl ammonium hydroxide (which benzyl substituted ammonium hydroxides are described in greater detail in the Powers and Bock Patent No. 2,009,015), and zinc chloride; true and colloidal solutions of cellulose xanthate in water and aqueous alkalis such as aqueous sodium hydroxide solution as, for example, viscose syrups or dopes; true and colloidal solutions of cellulose or reaction products of cellulose and ammonia-copper complexes in an aqueous solution of an ammonia-copper complex as, for example, cuprammonium spinning solutions or dopes; and true and colloidal solutions of cellulose ethers such as carboxymethyl cellulose, methyl cellulose, ethyl cellulose and the like in water or aqueous alkali such as aqueous sodium hydroxide solution. But such terms are not intended to include organic acid or anhydride derivatives of cellulose such as cellulose acetate solutions, cellulose propionate solutions or other solutions of a product obtained by reacting cellulose with an organic acid or anhydride.

The spinning solutions or dopes of this invention may contain varying amounts of cellulose, cellulose xanthate, cellulose ethers or the like, depending on whether they are subsequently employed for spinning filaments, staple fibers, free films or whether they are to be used for coating purposes. In general, they contain from about 2 to 15% by weight of cellulose or the named cellulose derivatives, or even larger or smaller amounts. However, in most instances it is preferred to use spinning solutions or dopes which contain from about 5 to 10% of the cellulose or the named cellulose derivatives such as cellulose xanthate. The preferred spinning solution or dope is viscose which is used in the preparation of viscose rayon or cellophane.

The preparation of viscose and cuprammonium spinning solutions is described generally in "The Rayon Industry" (1927), published by D. Van Nostrand Company, New York, N.Y., on pages 256–267 and pages 320–329, respectively. More detailed descriptions for preparing viscose spinning solutions are described in patents listed on pages 468 and 469 of said publication. Specific descriptions for preparing cuprammonium spinning solutions are described in patents listed on pages 455–462 of said publication.

The spinning solutions or dopes described above may contain conventional additives such as delustering agents as, for example, titanium dioxide, zinc oxide, mineral oils or the like, cationic and non-ionic surface active agents to inhibit incrustation of spinning orifices, dyes and colored pigments and the like. Such solutions or dopes may also contain from 1 to 5% by weight of an inert fire-retardant agent such as antimony oxide.

The term "neutral to alkaline reaction product of phosphoryl chloride and ammonia" as used in the specification and the appended claims is intended to include the monomeric or only slightly polymerized reaction products of phosphoryl chloride and ammonia prepared in an inert, anhydrous liquid, which products dissolve in water to form a solution having a pH of 7 or higher, and is also intended to include polymerized reaction products of phosphoryl chloride and ammonia, which polymerized products are substantially insoluble in water and may be utilized as a dispersion in water having a pH between 7 and about 7.5. The above described reaction products are insoluble in acidic aqueous solutions. The reaction products which are normally soluble in neutral to alkaline aqueous solutions are precipitated in acidic aqueous solutions and are rendered insoluble. Hence, when the spinning solution or dope which contains such products is coagulated in an acidic aqueous coagulating bath, the product is precipiated in the cellulosic structure and is rendered insoluble so that it is not removed in appreciable quantities by subsequent launderings or leachings in a substantially neutral aqueous medium.

The monomeric or substantially unpolymerized reaction products of phosphoryl chloride (otherwise known as phosphorous oxychloride) and ammonia, which products have been designated phosphoryl amide, may be prepared in various ways. A suitable method of preparing such reaction products comprises reacting phosphoryl chloride and ammonia in an inert, anhydrous liquid such as kerosene, naphtha, benzene, hexane or some other inert liquid which does not react with ammonia or phosphoryl chloride. The reaction mixture is maintained at a temperature between about 20° and 100° C. during the addition of the ammonia and until 5 mols of ammonia have been added for each mol of phosphoryl chloride. The temperature of the reaction mixture is then raised above 110° C. but below 150° C. and is maintained within such temperature range for a period of about 360 to 30 minutes. The resulting product, which is insoluble in the inert liquid, is separated from the inert liquid by filtration, centrifuging or decantation and then washed with acetone to remove the inert liquid. The product thus obtained is a mixture of ammonium chloride and the reaction product desired. Since ammonium chloride is often detrimental to the stability of some of the cellulosic spinning solutions hereinbefore described, it is preferred to separate a substantial portion of the ammonium chloride from such mixture. This is suitably accomplished by extracting the mixture with anhydrous liquid ammonia which is a solvent for the ammonium chloride, but is a non-solvent for the desired reaction product. The dry product obtained after such extraction is essentially free of chlorine and is a white non-hydroscopic powder which dissolves in water to form a solution having a pH between 7.0 and 8.5. This product has a molecular weight, as determined cryoscopically, within the range of 180 to 300, and preferably a nitrogen to phosphorous atomic ratio between about 2.1:1 and 2.3:1.

The polymerized reaction products of phosphoryl chloride and ammonia, which have been designated polyphosphorylamide, may also be prepared in various ways. A suitable method for preparing polyphosphorylamide comprises reacting phosphoryl chloride and ammonia in an inert, anhydrous liquid such as that described in the foregoing process at a temperature between about 20° and 100° C. until 5 mols of ammonia have been added for each mol of phosphoryl chloride. The temperature of the reaction mixture is then raised to a temperature above 150° C. and preferably between 155° and 240° C., until the reaction product is substantially water-insoluble. The resulting product is then recovered from the inert liquid by filtration, decantation or by centrifuging, and is then leached with water to remove the ammonium chloride present therein. The dry product is substantially insoluble in water and when dispersed in water provides a dispersion which is substantially neutral in reaction. The pH of such dispersion is usually between 7.0 and 7.5. The product has a nitrogen to phosphorous ratio within the range of about 1.5:1 to 2.0:1, and preferably between 1.7:1 and 1.95:1. The product is a white powder which is essentially non-hygroscopic and may be comminuted until the particles therein are sufficiently small to pass through the orifices of spinnerets commonly used in viscose and cuprammonium spinning without clogging the holes in such spinnerets.

The regenerated cellulose or cellulose ether structures of the present invention are prepared, in general, by first shaping the aqueous cellulosic spinning solutions or dopes to the desired size and form and then subjecting the shaped solution or dope to an aqueous coagulating bath whereby the cellulose, cellulose xanthate or cellulose ether in the solution or dope is precipitated. The alkaline aqueous solutions of cellulose in sodium zincate and benzyl substituted ammonium hydroxide, the solutions of cellulose xanthate in water or aqueous alkali, the cuprammonium solutions or dopes and the solutions of cellulose ethers are normally coagulated in an acidic aqueous coagulating bath although they may be first coagulated in water, after which the coagulated structure is then hardened or set in an acidic aqueous solution.

In preparing the aqueous cellulosic spinning solutions or dopes for use in the processes of this invention, it is preferred to mix the cellulose solutions, the viscose, the cuprammonium solutions or the cellulose ether solutions with the neutral to alkaline reaction product of phosphoryl chloride and ammonia within a period of about 60 minutes prior to the formation of the desired cellulosic structures since the efficiency of such reaction products as fire-retardants decreases to some extent on continued standing in such cellulosic solutions.

The spinning solutions or dopes containing the neutral to alkaline water-soluble reaction products of phosphoryl chloride and ammonia (phosphorylamide) coagulate and harden in acidic aqueous coagulating solutions or baths, and simultaneously the reaction product of phosphoryl chloride and ammonia is precipitated in the resulting coagulate by the action of the acid and is rendered insoluble. The resulting structure may be washed with water to remove the water-soluble solvents and salts contained therein, and, in the case of viscose structures, may also be desulfurized under mildly alkaline conditions without leaching out substantial amounts of the precipitated phosphoryl chloride-ammonia reaction product. Cuprammonium structures may be decopperized with dilute aqueous sulfuric acid solutions and washed with water to remove water-soluble impurities in the structure without removing substantial amounts of the precipitated phosphoryl chloride ammonia reaction product. The dry regenerated cellulose or cellulose ether structures thus obtained have good to excellent afterglow-resistant and fire-retardant properties and retain such properties after about 1 to 5 launderings, or on leaching in water.

The spinning solutions or dopes containing the neutral to alkaline water-insoluble reaction products of phosphoryl chloride and ammonia (polyphosphorylamide), which are dispersed therein in the form of fine particles, coagulate and harden in acidic aqueous coagulating solutions or baths to form regenerated cellulose, or cellulose ether structures which have the water-insoluble polyphosphorylamide particles uniformly dispersed therein. Such structures may be washed or leached with water to remove water-soluble impurities contained therein without removing appreciable amounts of the water-insoluble polyphosphorylamide. In the case of regenerated cellulose structures obtained by coagulating viscose in acid and aqueous coagulating baths, the structures are readily washed with water to remove water-soluble materials and then desulfurized with normal desulfurizing solutions such as aqueous ammonium sulfide or aqueous sodium sulfide solutions without removing appreciable amounts of the water-insoluble polyphosphorylamide. Regenerated cellulose structures obtained from cuprammonium solutions or dopes are readily washed or leached with water and decoppered by leaching in dilute aqueous sulfuric acid solutions and finally washed or leached with water without removing appreciable amounts of the water-insoluble polyphosphorylamide. The dry regenerated cellulose or cellulose ether structures thus obtained have good to excellent afterglow-resistant and fire-retardant properties after a considerable number of launderings, or on leaching in water.

A wide variety of afterglow-resistant and fire-retardant regenerated cellulose or cellulose ether structures may be prepared in accordance with the processes of the present invention. Thus it is possible to produce afterglow-resistant and fire-retardant regenerated cellulose or cellulose ether filaments by extruding the aqueous cellulosic spining solution or dopes, hereinbefore described, through fine orifices such as the fine orifices in a spinneret or through a single orifice into an acidic aqueous coagulating bath to regenerate the cellulose or to precipitate the cellulose ether in filament form, after which the filaments may be collected on spools, or in centrifugal pots or processed continuously in well-known manner. The filaments are then processed in the normal manner, that is, washed, desulfurized or decoppered, if necessary, washed, dried, oiled, twisted, coned or the like. Bundles of filaments or tow may also be spun in like manner and then cut to staple length to form staple fibers which may then be processed by washing etc. in the same manner as filaments.

A general procedure for spinning viscose to form filaments of regenerated cellulose is described in "The Rayon Industry" publication hereinbefore referred to, particularly pages 267–279, and also in "Matthew's Textile Fibers," 5th ed. (1947), published by John Wiley and Sons, Inc., New York, N.Y., pages 750–754. Similar procedures are also useful in spinning cellulose solutions such as solutions of cellulose in aqueous sodium zincate or calcium thiocyanate. A general procedure for spinning filaments of cuprammonium cellulose is described in "The Rayon Industry" publication hereinbefore referred to above, pages 329 to 335.

Afterglow-resistant and fire-retardant regenerated cellulose or cellulose ether foils, tubes, artificial straw or horse hair and other similar structures are readily prepared in the same manner as filaments or staple fibers described above by using a spinning orifice or nozzle appropriate for producing such structures. Such orifices or nozzles are known in the art.

The filaments, staple fibers and other similar products, prepared as described above, are readily processed into knit or woven fabrics in the well-known manner. For example, the filaments, tubes, rods and the like are sized and then woven or knitted into fabrics, while the staple fibers, straw or horsehair are first converted into threads or yarns which are then sized and woven or knitted. The resulting fabrics have afterglow-resistant and fire-retardant properties and retain these properties after they have been laundered or leached in water.

It is also possible to produce union fabrics, that is, fabrics comprising the afterglow-resistant and fire-retardant regenerated cellulose or cellulose ether filaments or staple fibers, prepared as described herein, in combination with other textile yarns or fibers, for example, cotton yarns or fibers, wool yarns or fibers, casein yarns or fibers, linen yarns or fibers or the like. By incorporating 50% or more of such afterglow-resistant and fire-retardant regenerated cellulose or cellulose ether filaments or staple fibers in the union fabrics, it is possible to provide union fabrics which have fair to good fire-retardant properties, particularly when such filaments or staple fibers are combined with wool yarns or fibers.

Afterglow-resistant and first-retardant regenerated cellulose or cellulose ether free-films are readily prepared by extruding the aqueous cellulose spining solutions or dopes, hereinbefore described, through a wide, thin slit into an acidic aqueous coagulating bath. The wet film is then washed or leached in water until the water-soluble impurities are substantially removed and the film is then processed in the normal way, that is, it is desulfurized or decoppered, if necessary, washed, and then treated with humectants or plasticizers for the regenerated cellulose or cellulose ether, either before or after drying.

It is also possible in accordance with the present invention to provide an afterglow-resistant and fire-retardant regenerated cellulose or cellulose ether coating on substrates such as textile materials or paper by coating or impregnating the textile materials or paper with the aqueous cellulosic spinning solutions or dope, hereinbefore described, after which the treated textile material or paper is treated with an acidic aqueous coagulating bath to regenerate the cellulose or precipitate the cellulose ether in situ on such textile material or paper. The resulting material is then leached or washed with water to remove acid and water-soluble impurities, if necessary, and is then dried.

The regenerated cellulose or cellulose ether structure prepared in accordance with the present invention may comprise varying amounts of the neutral to alkaline reaction products of phosphoryl chloride and ammonia. A structure containing from about 3 to 25% by weight of such reaction products, based on the regenerated cellulose or cellulose ether therein, has good to excellent afterglow-resistant and fire-retardant properties and is preferred. Such reaction products are uniformly distributed through the body of the regenerated cellulose or cellulose ether structure and impart uniform afterglow-resistant and fire-retardant properties to such structures.

The reaction products which are originally water-soluble have some advantages over the initially water-insoluble reaction products in that they are readily incorporated in the spinning solutions or dopes and are extruded through fine spinneret orifices without danger of clogging such orifices. Moreover, the acidic coagulating bath precipitates the initially water-soluble reaction products in the form of extremely finely-divided particles so that the structures have a uniform appearance. The initially water-insoluble reaction products have some advantages over the initially water-soluble reaction products in that they are more resistant to removal from the regenerated cellulose or cellulose ether structures at any stage of processing and also during the period of time that such structures are used. Hence, structures containing the initially water-insoluble reaction product have more permanent afterglow-resistant and fire-retardant properties. Further, in the case of the water-insoluble reaction products, it is not necessary to use acidic aqueous coagulating baths to render such reaction products insoluble, whereas, if acidic aqueous coagulating baths are not used to coagulate spinning solutions or dopes containing the initially water-soluble reaction products it is generally necessary to give the coagulated structure a heat treatment between about 100 and 200° C. to obtain a structure which has substantially permanent afterglow-resistant and fire-retardant properties.

A further understanding of the compositions, processes, and regenerated cellulose or cellulose ether structures of the present invention will be obtained from the following specific examples which are intended to illustrate the invention, but not to limit the scope thereof, parts and percentages being by weight unless otherwise specified.

*Example I*

An aged viscose syrup containing about 7% of cellulose and 5%, based on the cellulose in said syrup, of a neutral water-soluble reaction product of phosphoryl chloride and ammonia which was prepared by reacting phosphoryl chloride and ammonia in an inert, anhydrous liquid, designated as phosphorylamide, was extruded continuously through a spinneret containing 100 orifices into a coagulating bath containing 65% water, 18% sodium sulfate, 10% sulfuric acid, 1% zinc sulfate and 6% glucose at a rate sufficient to produce a 100/60 viscose rayon filament yarn. The coagulated filaments were then wound on a bobbin. During the coagulation of the filament in the acid coagulating bath the phosphorylamide precipitated in situ inside the filament as an insoluble material. The wound yarn on the bobbin was allowed to stand until the cellulose xanthate was converted to regenerated cellulose and was then leached in water to remove the acid and water-soluble impurities in the yarn. The yarn was then dried on the bobbin. The dried yarn had a uniform, delustered appearance. When an open flame was impinged on the yarn thus produced or on a fabric prepared from such yarn, the yarn or fabric ignited but did not support combustion after the flame was removed. Moreover, there was no appreciable afterglow in the yarn and fabric after the flame was removed.

The yarn and fabric were given a standard A.A.T.C.C. (American Association of Textile Colorists and Chemists) cotton wash and then dried. An open flame was impinged on the resulting yarn and fabric, and, although the yarn and fabric ignited, the yarn and fabric did not support combustion after the flame was removed. Further, there was no appreciable afterglow in the yarn and fabric after the flame was removed.

*Example II*

Aged viscose syrups containing about 7% of cellulose and 10 and 20%, respectively, based on the cellulose in said syrups, of an alkaline water-soluble reaction product of phosphoryl chloride and ammonia which was prepared by reacting phosphoryl chloride and ammonia in an inert, anhydrous liquid, designated as phosphorylamide, were spun separately into 100/60 viscose rayon filament yarns and processed as described in Example I. The dried yarns had a uniform, delustered appearance. An open flame was impinged on each of the yarns and the yarns did not ignite. Moreover, they did not exhibit afterglow.

The yarns were given two standard A.A.T.C.C. cotton washes and were then dried. An open flame was then impinged on the dried yarns and the yarns did not ignite. Moreover, they did not exhibit afterglow after the flame was removed.

*Example III*

Aged viscose syrups containing about 7% of cellulose and 5, 10 and 20%, respectively, based on the cellulose in said syrups, of a neutral water-insoluble reaction product of phosphoryl chloride and ammonia prepared in an inert, anhydrous liquid, designated as polyphosphorylamide, in the form of fine particles capable of passing through a circular orifice having a diameter of 0.002 inch, were separately and continuously extruded through a spinneret containing 100 orifices each having a diameter of 0.002 inch into a coagulating bath containing 64% water, 18% sodium sulfate, 11% sulfuric acid, 1% zinc sulphate and 6% glucose at a rate sufficient to produce 100/60 viscose rayon filament yarns. The coagulated yarns were wound separately on bobbins and were allowed to stand until the cellulose xanthate in the filaments was converted to regenerated cellulose. The yarns on the three separate bobbins were then leached in water until they were free of acid and water-soluble impurities and the yarns were then dried on the bobbin. The dried yarns had a delustered appearance. The dried yarn prepared from the viscose syrup containing 5% of polyphosphorylamide, based on the cellulose in the syrup, was held in an open flame and although the yarn ignited it did not support combustion after it was removed from the flame. Moreover, it did not exhibit any appreciable afterglow. The dried yarns prepared from the viscose syrups containing 10 and 20%, respectively, of polyphosphorylamide, based on the cellulose in the syrups, were held in an open flame. These yarns did not ignite, and did not exhibit afterglow after they were removed from the flame.

All of the yarns described immediately above were subjected to three standard A.A.T.C.C. cotton washes and were then dried. The resulting yarns had substantially the same afterglow-resistant and fire-retardant properties as the unwashed yarns.

*Example IV*

A cuprammonium spinning solution containing about 8% cellulose and 10%, based on the cellulose in the solution, of a neutral water-insoluble reaction product of phsphoryl chloride and ammonia, prepared in an inert, anhydrous liquid, designated as polyphosphorylamide, in the form of fine particles capable of passing through a circular orifice having a diameter of 0.002 inch, was extruded continuously through a spinneret containing 100 orifices each having a diameter of 0.002 inch into a coagulating bath consisting of 50% water and 50% sulfuric acid at a rate sufficient to produce 100/60 cuprammonium rayon filament yarn. The coagulated yarn was collected on a bobbin and was leached with a 2% aqueous sulfuric acid solution until the yarn was free of copper and then leached with water until it was substantially free of water-soluble copper salts, acid and other water-soluble impurities. The resulting yarn was dried and had a delustered appearance in the dry state. An open flame was impinged on the dry yarn and it was observed that the yarn did not ignite. Moreover, the yarn did not exhibit afterglow after it was removed from the flame. The yarn retained its original afterglow-resistant and fire-retardant properties after three standard A.A.T.C.C. cotton washes.

*Example V*

Six parts of a neutral water-soluble reaction product of phosphoryl chloride and ammonia prepared in an inert, anhydrous liquid, designated as phosphorylamide, in the form of a white powder was added to 200 parts of an aqueous sodium hydroxide solution containing 15% hydroxy ethyl cellulose. The resulting solution was well agitated and then immediately applied to a glass plate by means of a Bird applicator which was adjusted so as to produce a film 0.006 inch thick. The glass plate was immersed in a 10% aqueous sulfuric acid solution to coagulate the film. During the coagulation of the film, the phosphorylamide was precipitated in situ within the film in the form of fine particles. The film which consisted of hydroxy ethyl cellulose having fine particles of insoluble phosphorylamide distributed uniformly therein, was leached with water until it was substantially free of acid and water-soluble impurities and then dried at about 130° F. This film was held in an open flame and did not ignite and did not support combustion after the flame was removed. Moreover, the film did not exhibit afterglow when the flame was removed.

The film was leached in water for 30 minutes and dried. The dry film thus obtained had substantially the same afterglow-resistant and fire-retardant properties as the unleached film.

Various changes may be made in the compositions, processes, and regenerated cellulose or cellulose ether structures described herein as will be apparent to those skilled in the art to which this invention appertains without departing from the spirit and intent of the present invention. It is to be understood, therefore, that it is intended the present invention should not be limited except by the scope of the appended claims.

This application is a division of our copending application Serial No. 234,666, filed June 30, 1951, now U.S. 2,816,004.

What is claimed is:

1. An aqueous alkaline cellulose ether solution containing a cellulose ether in solution which is capable of being precipitated from said solution on acidification and an amount of a neutral to alkaline water-insoluble reaction product of phosphoryl chloride and ammonia sufficient to provide afterglow-resistant and fire-retardant properties to a dry cellulose ether material formed from solution by acidification, said reaction product having been prepared in an inert, anhydrous liquid and having a nitrogen to phosphorus atomic ratio of about 1.5:1 to 2.0:1.

2. An aqueous alkaline cellulose ether solution containing from about 2 to 15% by weight of a cellulose ether in solution which is capable of being precipitated from said solution on acidification and from about 3 to 25% by weight, based on the cellulose in said solution, of a neutral to alkaline water-insoluble reaction product of phosphoryl chloride and ammonia prepared in an inert, anhydrous liquid and having a nitrogen to phosphorus ratio of about 1.5:1 to 2.0:1.

3. An aqueous sodium hydroxide solution of from about 2 to 15% by weight of hydroxy ethyl cellulose and from about 3 to 25% by weight, based on the cellulose in said solution, of a neutral to alkaline water-insoluble reaction product of phosphoryl chloride and amonia prepared in an inert, anhydrous liquid and having a nitrogen to phosphorus atomic ratio of 1.7:1 to 1.95:1.

4. A process of preparing cellulose ether materials which have afterglow-resistant and fire-retardant properties which comprises extruding an aqueous alkaline cellulose ether solution containing from about 2 to 15% by weight of a cellulose ether in solution which is capable of being precipitated from said solution on acidification and from about 3 to 25% by weight, based on the cellulose in said ether, of a neutral to alkaline water-insoluble reaction product of phosphoryl chloride and ammonia prepared in an inert, anhydrous liquid and having a nitrogen to phosphorus atomic ratio of about 1.5:1 to 2.0:1, through a shaping orifice into a acidic aqueous coagulating bath, subjecting the extruded solution to the action of an aqueous acid solution until it is coagulated and subsequently drying the coagulated cellulose ether material.

5. A process of preparing cellulose ether films which have afterglow-resistant and fire-retardant properties which comprises extruding an aqueous alkaline cellulose ether solution containing from about 2 to 15% by weight of a cellulose ether in solution which is capable of being precipitated from said solution on acidification and from about 3 to 25% by weight, based on the cellulose in said ether, of a uniformly dispersed neutral to alkaline water-insoluble reaction product of phosphoryl chloride and ammonia prepared in an inert, anhydrous liquid and having a nitrogen to phosphorus ratio of about 1.5:1 to 2.0:1, through an orifice shaped to form a film of said solution into an acidic aqueous coagulating bath, subjecting the thus extruded film to the action of an aqueous acid solution until the film is coagulated, subsequently washing said film with water to remove acid therefrom and subsequently drying said film.

6. A process as in claim 5, but further characterized in that the cellulose ether solution is a solution of hydroxy ethyl cellulose in aqueous sodium hydroxide.

7. A process of preparing cellulose ether filaments which have afterglow-resistant and fire-retardant properties which comprises extruding an aqueous alkaline cellulose ether solution containing from about 2 to 15% by weight of a cellulose ether in solution which is capable of being precipitated from solution on acidification and from about 3 to 25% by weight, based on the cellulose in said ether, of a uniformly dispersed, neutral to alkaline water-insoluble reaction product of phosphoryl chloride and ammonia prepared in an inert, anhydrous liquid and having a nitrogen to phosphorus atomic ratio of about 1.5:1 to 2.0:1, through the orifices of a spinning nozzle into an acidic aqueous coagulating bath to form filaments of said cellulose ether containing said reaction product uniformly dispersed therein, subsequently washing said filaments to remove acid therefrom and subsequently drying said filaments.

8. A process as in claim 7, but further characterized in that said cellulose ether solution is a solution of hydroxy ethyl cellulose in aqueous sodium hydroxide.

9. A process of producing an afterglow-resistant and fire-retardant coating on a surface which comprises coating a surface with a film of an aqueous alkaline cellulose ether solution containing from about 2 to 15% by weight of a cellulose ether in solution which is capable of being precipitated from said solution on acidification and from about 3 to 25% by weight, based on the cellulose in said ether, of a neutral to alkaline water-insoluble reaction product of phosphoryl chloride and ammonia prepared in an inert, anhydrous liquid and having a nitrogen to phosphorus atomic ratio of about 1.5:1 to 2.0:1, subjecting said film to the action of an aqueous acid solution until said film is coagulated, subsequently washing said film with water to remove acid therefrom and subsequently drying said film.

References Cited in the file of this patent

UNITED STATES PATENTS

| | | |
|---|---|---|
| 2,188,322 | Tattersall | Jan. 30, 1940 |
| 2,199,385 | Bass | May 7, 1940 |
| 2,427,997 | White | Sept. 23, 1947 |
| 2,464,342 | Pollak | Mar. 15, 1949 |
| 2,661,264 | Malowan | Dec. 1, 1953 |
| 2,680,077 | Nielsen et al. | June 1, 1954 |
| 2,732,279 | Tachikawa | Jan. 24, 1956 |
| 2,775,505 | Pedlow | Dec. 25, 1956 |
| 2,876,117 | Jackson et al. | Mar. 3, 1959 |